United States Patent
Detering et al.

(10) Patent No.: US 9,382,377 B2
(45) Date of Patent: Jul. 5, 2016

(54) POLYMER MIXTURES AS DEPOSIT INHIBITORS IN WATER-BEARING SYSTEMS

(75) Inventors: Jürgen Detering, Limburgerhof (DE); Torben Gädt, Traunstein (DE); Stephan Nied, Neustadt / Wstr. (DE); Andreas Kempter, Neustadt (DE); Bolette Urtel, Bobenheim-Roxheim (DE); Jessica Neumann, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 615 days.

(21) Appl. No.: 13/569,538

(22) Filed: Aug. 8, 2012

(65) Prior Publication Data

US 2013/0037491 A1    Feb. 14, 2013

Related U.S. Application Data

(60) Provisional application No. 61/521,814, filed on Aug. 10, 2011.

(51) Int. Cl.

| | |
|---|---|
| *C02F 5/08* | (2006.01) |
| *C02F 5/10* | (2006.01) |
| *C08F 20/06* | (2006.01) |
| *C08F 120/06* | (2006.01) |
| *C08F 220/06* | (2006.01) |
| *C08F 20/04* | (2006.01) |
| *C08F 120/04* | (2006.01) |
| *C08F 220/04* | (2006.01) |
| *C08F 110/10* | (2006.01) |
| *C08G 63/60* | (2006.01) |
| *C08L 73/00* | (2006.01) |
| *C08L 33/00* | (2006.01) |
| *C08F 10/10* | (2006.01) |
| *C08F 210/10* | (2006.01) |
| *C08F 20/08* | (2006.01) |
| *C08F 16/02* | (2006.01) |
| *C02F 1/00* | (2006.01) |
| *C02F 5/02* | (2006.01) |
| *C08F 16/12* | (2006.01) |
| *C08F 116/12* | (2006.01) |
| *C08F 216/12* | (2006.01) |
| *C08F 10/00* | (2006.01) |
| *C02F 103/02* | (2006.01) |
| *C02F 103/08* | (2006.01) |

(52) U.S. Cl.
CPC . *C08G 63/60* (2013.01); *C02F 5/10* (2013.01); *C08F 10/10* (2013.01); *C08F 16/02* (2013.01); *C08F 20/06* (2013.01); *C08F 20/08* (2013.01); *C08F 110/10* (2013.01); *C08F 210/10* (2013.01); *C02F 2103/023* (2013.01); *C02F 2103/08* (2013.01); *C08F 16/12* (2013.01)

(58) Field of Classification Search
None
See application file for complete search history.

(56) References Cited

U.S. PATENT DOCUMENTS

| | | | |
|---|---|---|---|
| 4,640,793 A | | 2/1987 | Persinski et al. |
| 4,698,161 A | | 10/1987 | Hansen |
| 4,925,568 A | | 5/1990 | Morse |
| 4,936,987 A | * | 6/1990 | Persinski et al. ............... 210/699 |
| 5,080,801 A | | 1/1992 | Molter et al. |
| 5,242,599 A | * | 9/1993 | Chen et al. .................... 210/697 |
| 5,263,541 A | | 11/1993 | Barthorpe et al. |
| 5,575,920 A | * | 11/1996 | Freese .................... C23F 11/173 210/697 |
| 7,252,770 B2 | | 8/2007 | Austin et al. |
| 2003/0173303 A1 | | 9/2003 | Austin et al. |
| 2005/0186440 A1 | * | 8/2005 | Hausmann et al. ........... 428/515 |
| 2006/0191852 A1 | | 8/2006 | Austin et al. |
| 2007/0049710 A1 | * | 3/2007 | Kozuki et al. .................... 526/68 |
| 2009/0101587 A1 | | 4/2009 | Blokker et al. |
| 2012/0004383 A1 | | 1/2012 | Laubender et al. |
| 2012/0021957 A1 | | 1/2012 | Alemany et al. |
| 2012/0129749 A1 | | 5/2012 | Detering et al. |
| 2012/0129750 A1 | | 5/2012 | Detering et al. |
| 2012/0199783 A1 | | 8/2012 | Detering et al. |
| 2012/0202937 A1 | | 8/2012 | Urtel et al. |
| 2012/0214941 A1 | | 8/2012 | Kleiner et al. |
| 2012/0220707 A1 | | 8/2012 | Dungworth et al. |

FOREIGN PATENT DOCUMENTS

| | | | | |
|---|---|---|---|---|
| CA | 1340659 | | 7/1999 | |
| CA | 1340659 C | * | 7/1999 | ................ C02F 5/14 |
| EP | 0337694 A2 | * | 10/1989 | ............ C02F 222/02 |
| EP | 0388836 A1 | * | 9/1990 | ................ C02F 5/10 |
| JP | H154789 A | * | 6/1994 | ................ C02F 5/10 |

(Continued)

OTHER PUBLICATIONS

Machine translation of JPH154789A to Shoichi, et al. pp. 1-12.*

(Continued)

*Primary Examiner* — Nam Nguyen
*Assistant Examiner* — Clare Perrin
(74) *Attorney, Agent, or Firm* — Oblon, McClelland, Maier & Neustadt, L.L.P.

(57) ABSTRACT

A polymer mixture in solid or aqueous form includes a content of from 5 to 95% by weight of a first polymer and a content of from 5 to 95% by weight of a second polymer. The first polymer is a water-soluble or water-dispersible polymer having a weight-average molecular weight of 1000 to 20 000 g/mol. The second polymer is a water-soluble or water-dispersible polymer having a weight-average molecular weight of 1000 to 50 000 g/mol. The polymer mixture can inhibit precipitation and sedimentation of calcium salts and magnesium salts in water-bearing systems.

20 Claims, No Drawings

(56) References Cited

FOREIGN PATENT DOCUMENTS

| WO | WO 2011/054789 A1 | 5/2011 |
|----|-------------------|--------|
| WO | WO 2012/001092 A1 | 1/2012 |
| WO | WO 2012/016835 A2 | 2/2012 |
| WO | WO 2012/069365 A1 | 5/2012 |
| WO | WO 2012/069440 A1 | 5/2012 |
| WO | WO 2012/104304 A1 | 8/2012 |
| WO | WO 2012/104325 A1 | 8/2012 |
| WO | WO 2012/104401 A1 | 8/2012 |
| WO | WO 2012/156257 A1 | 11/2012 |
| WO | WO 2012/163679 A1 | 12/2012 |
| WO | WO 2012/171998 A1 | 12/2012 |
| WO | WO 2013/013971 A1 | 1/2013 |
| WO | WO 2013/02079 A1 | 2/2013 |

OTHER PUBLICATIONS

U.S. Appl. No. 13/363,576, filed Feb. 1, 2012, Haberecht, et al.
U.S. Appl. No. 13/545,534, filed Jul. 10, 2012, Detering, et al.
U.S. Appl. No. 13/545,455, filed Jul. 10, 2012, Gaedt, et al.
International Search Report and Written Opinion issued Oct. 10, 2012 in PCT/EP2012/065308.

* cited by examiner

POLYMER MIXTURES AS DEPOSIT INHIBITORS IN WATER-BEARING SYSTEMS

The invention relates to polymer mixtures as deposit inhibitors for inhibiting the precipitation and sedimentation of calcium salts and magnesium salts in water-bearing systems.

The solubility of most substances in water is restricted. In particular, in industrial water treatment, the prevention of mineral sediments in water-bearing systems is an essential task. Inorganic substances and salts such as calcium carbonate, magnesium carbonate, magnesium hydroxide, calcium sulfate and barium sulfate, and calcium phosphate have a low solubility in water. If these dissolved components are concentrated in aqueous systems (thickening), the solubility product is exceeded with the consequence that these substances precipitate out and cause sediments. The solubility of the substances is, in addition, dependent on the temperature and the pH. In particular, many substances such as calcium carbonate, calcium sulfate or magnesium hydroxide exhibit an inverse solubility, i.e. their solubility decreases with increasing temperature. This leads to high process temperatures frequently being the cause of unwanted precipitates and formation of deposits in cooling and boiler feed water systems on heat-exchange surfaces or in pipelines.

Precipitates and sediments of inorganic substances and salts in water-bearing systems may only be removed again with great effort. Each mechanical and chemical cleaning is costly and time-consuming and inescapably leads to production failures.

Not only in cooling and boiler feed water systems are attempts made to prevent the formation of calcium carbonate deposits, calcium sulfate deposits, magnesium hydroxide deposits and other salt deposits. Also in seawater desalination by distillation and by membrane methods such as reverse osmosis or electrodialysis, efforts are made to prevent formation of these solid deposits. In particular in thermal seawater desalination plants, both effects, namely firstly concentration by evaporation of water, and, secondly, high processing temperatures, play an important role.

The productivity of desalination plants is limited in this case by the upper processing temperature. It is desirable to operate seawater desalination plants at an evaporation temperature as high as possible in order to achieve a process efficiency as high as possible and to minimize the energy required for producing fresh water. For characterization of the process efficiency, the characteristic $kWh/m^3$ of water is used. This characteristic can be minimized by process temperatures as high as possible for the multistage expansion evaporation process and the multiple effect evaporation process. The maximum process temperature in these processes is limited, primarily, by the deposit formation which increases continuously with increasing temperature. It is known that, in particular, the sedimentation of basic magnesium salts such as magnesium hydroxide (brucite) and magnesium carbonate hydroxide (hydromagnesite), and also calcium carbonate and calcium sulfate play a critical role in thermal desalination plants.

It is known that low-molecular-weight polyacrylic acids and salts thereof produced by means of free-radical polymerization are employed as deposit inhibitors in industrial water treatment and in seawater desalination owing to the dispersant properties, and properties inhibiting crystal growth, thereof. For a good activity, the mean molecular weight ($M_w$) of these polymers should be <50 000 g/mol. Frequently, polyacrylic acids having $M_w$<10 000 g/mol are described as particularly effective. A disadvantage of these polymers is their sensitivity to hardness rising with increasing temperature, i.e. the risk that the polymers precipitate as Ca or Mg polyacrylates increases. In addition, the polyacrylic acids have only a very low inhibitory activity against sediments of brucite or hydromagnesite.

In addition, it is known that copolymers comprising sulfonic acid groups act as deposit inhibitors, in particular for avoiding deposits of calcium phosphates and calcium phosphonates. A disadvantage of these polymers is their limited activity for avoiding $CaCO_3$ precipitates.

In order to compensate for the disadvantages of certain polymers, frequently mixtures of a plurality of different polymers or copolymers are used. In the case of polymer mixtures, a synergistic activity is observed from time to time.

EP 388 836 discloses a mixture of a hydrolyzed polymaleic anhydride and a hydrolyzed copolymer of maleic anhydride and ethylenically unsaturated copolymers having a molecular weight from 400 to 800 g/mol for inhibiting scale sediments in aqueous systems. Ethylenically unsaturated comonomers mentioned are acrylic acid, methacrylic acid, crotonic acid, itaconic acid, aconitic acid, itaconic anhydride, ethyl acrylate, methyl methacrylate, acrylonitrile, acrylamide, vinyl acetate, styrene, alpha-methylstyrene, vinylsulfonic acid, 2-acrylamido-2-methylpropanesulfonic acid, methyl vinyl ketone, acrolein, ethylene and propylene.

US 2009/0101587 A1 discloses a deposit-inhibiting composition comprising a copolymer of acrylic acid and 2-acrylamido-2-methylpropanesulfonic acid and an oligomeric phosphinosuccinic acid.

U.S. Pat. No. 5,263,541 discloses a mixture of polyvinyl sulfonate and polyacrylic acid as calcium sulfate deposit inhibitor.

DE 41 07 322 describes a composition of a hydrolyzed homopolymer of maleic anhydride having a weight-average molecular weight of 400 to 800 and a carboxyl-comprising acrylic polymer having a molecular weight of 800 to 9500 as deposit inhibitor. Acrylic polymers mentioned are polyacrylic acid and polymethacrylic acid, and also copolymers of acrylic acid or methacrylic acid with a vinyl carboxylate or styrene.

U.S. Pat. No. 4,936,987 describes a mixture of a copolymer of acrylic acid or methacrylic acid and 2-acrylamido-2-methylpropylsulfonic acid or 2-methacrylamido-2-methylpropylsulfonic acid and at least one further component. Further components mentioned are, inter alia, homopolymers of maleic acid or acrylic acid, and also copolymers of acrylamide and acrylate, copolymers of acrylic acid and 2-hydroxypropyl acrylate, or copolymers of maleic acid and sulfonated styrene.

JP 06154789 describes a composition of hydrolyzed copolymer of maleic anhydride and isobutene and hydrolyzed copolymer of maleic anhydride and aliphatic diene as deposit inhibitor. The inhibitor acts primarily against silicate and calcium carbonate deposits.

It is an object of the invention to provide compositions having an improved deposit-inhibiting activity which effectively prevent, in particular, precipitation and deposition of calcium carbonate, calcium sulfate and basic magnesium salts in the water-bearing systems.

The object is achieved by a polymer mixture in solid or aqueous form comprising, based on the polymer fraction,
(A) 5 to 95% by weight of a water-soluble or water-dispersible polymer having a weight-average molecular weight of 1000 to 20 000 g/mol of
  (a1)) 20 to 80% by weight of at least one monomer selected from the group consisting of $C_2$ to $C_8$ olefins, allyl alcohol, isoprenol, $C_1$ to $C_4$ alkyl vinyl ethers and vinyl esters of $C_1$ to $C_4$ monocarboxylic acids,
  (a2) 20 to 80% by weight of at least one monoethylenically unsaturated $C_3$ to $C_8$ carboxylic acid, an anhydride or salt of same,
  (a3) 0 to 50% by weight of one or more monomers comprising sulfonic acid groups,
(B) 5 to 95% by weight of a water-soluble or water-dispersible polymer having a weight-average molecular weight of 1000 to 50 000 g/mol of
  (b1) 30 to 100% by weight of at least one monoethylenically unsaturated $C_3$ to $C_8$ carboxylic acid, an anhydride or salt of same,
  (b2) 0 to 70% by weight of one or more monomers comprising sulfonic acid groups,
  (b3) 0 to 70% by weight of at least one nonionic monomer of the formula (I)

$$H_2C=C(R^1)(CH_2)_xO[R^2-O]_oR^3 \qquad (I),$$

where $R^1$ is hydrogen or methyl, $R^2$ is identical or different, linear or branched, $C_2$-$C_6$ alkylene radicals, which can be arranged in blocks or randomly, and $R^3$ is hydrogen or a straight-chain or branched $C_1$-$C_4$ alkyl radical, x is 0, 1 or 2, and o is a number from 3 to 50.

It has been found that mixtures of the polymers (A) and (B) have a higher activity in the inhibition of sediments of calcium carbonate, calcium sulfate and basic magnesium salts than the same amount of only one of the polymers (A) or (B) alone. One or more different polymers (A) can be mixed with one or more different polymers (B).

The polymer mixture according to the invention comprises 5 to 95% by weight of a water-soluble or water-dispersible polymer (A) of 20 to 80% by weight of at least one monomer (a1) selected from the group consisting of $C_2$ to $C_8$ olefins, allyl alcohol, isoprenol, $C_1$ to $C_4$ alkyl vinyl ethers and vinyl esters of $C_1$ to $C_4$ monocarboxylic acids, and 20 to 80% by weight of at least one monomer (a2) selected from unsaturated $C_3$ to $C_8$ carboxylic acids, anhydrides or salts of same, and also, optionally, 0 to 50% by weight of one or more monomers (a3) comprising sulfonic acid groups.

The polymer mixture comprises 5 to 95% by weight of a water-soluble or water-dispersible polymer (B) of 30 to 100% by weight of at least one monomer (b1) selected from monoethylenically unsaturated $C_3$ to $C_8$ carboxylic acids, anhydrides or salts of same, and also, optionally, 0 to 70% by weight of one or more monomers (b2) comprising sulfonic acid groups.

Suitable $C_2$ to $C_8$ olefins which can be used as monomer (a1) are, for example, ethylene, propylene, n-butene, isobutene, 1-pentene, 1-hexene, 1-heptene and diisobutene, preferably isobutene and diisobutene.

Suitable alkyl vinyl ethers which can be used as monomer (a1)) comprise 1 to 4 carbon atoms in the alkyl chain. Examples are vinyl methyl ether, vinyl ethyl ether, vinyl n-propyl ether, vinyl isopropyl ether, vinyl n-butyl ether and vinyl isobutyl ether.

Vinyl esters of $C_1$ to $C_4$ monocarboxylic acids which can be used as monomer (a1)) are, for example, vinyl formate, vinyl acetate, vinyl propionate and vinyl butyrate.

Preferred monomers (a1) are isobutene, diisobutene, vinyl acetate, vinyl methyl ether allyl alcohol and isoprenol. Particular preference is given to isobutene, diisobutene and isoprenol.

Suitable monoethylenically unsaturated $C_3$-$C_8$ carboxylic acids which can be used as monomer (a2) and (b1) are, for example, acrylic acid, methacrylic acid, ethacrylic acid, vinyl acetic acid, allyl acetic acid, crotonic acid, maleic acid, fumaric acid, mesaconic acid and itaconic acid and also water-soluble salts thereof. If said unsaturated $C_3$-$C_8$ carboxylic acids can form anhydrides, these anhydrides are also suitable as monomer (a1), for example maleic anhydride, itaconic anhydride and methacrylic anhydride.

Preferred monoethylenically unsaturated $C_3$-$C_8$ carboxylic acids are acrylic acid, methacrylic acid, maleic acid and fumaric acid and also anhydrides and water-soluble salts thereof. These are preferred both as monomer (a2) and monomer (b1). Water-soluble salts are, in particular, the sodium and potassium salts of the acids.

Monomers comprising sulfonic acid groups (a3) and (b2) are preferably those of the formulae (IIa) and (IIb)

$$H_2C=CH-X-SO_3H \qquad (IIa),$$

$$H_2C=C(CH_3)-X-SO_3H \qquad (IIb),$$

where X is an optionally present spacer group which can be selected from —$(CH_2)_n$— where n=0 to 4, —$C_6H_4$—, —$CH_2$—O—$C_6H_4$—, —C(O)—NH—$C(CH_3)_2$—, —C(O)—NH—$CH(CH_2CH_3)$—, —C(O)NH—$CH(CH_3)CH_2$—, —C(O)NH—$C(CH_3)_2CH_2$—, —C(O)NH—$CH_2CH(OH)CH_2$—, —C(O)NH—$CH_2$—, —C(O)NH—$CH_2CH_2$— and —C(O)NH—$CH_2CH_2CH_2$—.

Particularly preferred monomers comprising sulfonic acid groups are in this case 1-acrylamido-1-propanesulfonic acid (X=—C(O)NH—$CH(CH_2CH_3)$— in formula IIa), 2-acrylamido-2-propanesulfonic acid (X=—C(O)NH—$CH(CH_3)CH_2$— in formula IIa), 2-acrylamido-2-methylpropanesulfonic acid (AMPS, X=—C(O)NH—$C(CH_3)_2CH_2$— in formula IIa), 2-methacrylamido-2-methylpropanesulfonic acid (X=—C(O)NH—$C(CH_3)_2CH_2$— in formula IIb), 3-methacrylamido-2-hydroxypropanesulfonic acid (X=—C(O)NH—$CH_2CH(OH)CH_2$— in formula IIb), allylsulfonic acid (X=$CH_2$ in formula IIa), methallylsulfonic acid (X=$CH_2$ in formula IIb), allyloxybenzenesulfonic acid (X=—$CH_2$—O—$C_6H_4$— in formula IIa), methallyloxybenzenesulfonic acid (X=—$CH_2$—O—$C_6H_4$— in formula IIb), 2-hydroxy-3-(2-propenyloxy)propanesulfonic acid, 2-methyl-2-propene-1-sulfonic acid (X=$CH_2$ in formula IIb), styrenesulfonic acid (X=—$C_6H_4$ in formula IIa), vinylsulfonic acid (X not present in formula IIa), 3-sulfopropyl acrylate (X=—C(O)O—$CH_2CH_2CH_2$— in formula IIa), 2-sulfoethyl methacrylate (X=—C(O)O—$CH_2CH_2$— in formula IIb), 3-sulfopropyl methacrylate (X=—C(O)O—$CH_2CH_2CH_2$— in formula IIb), sulfomethacrylamide (X=—C(O)NH— in formula IIb), sulfomethylmethacrylamide (X=—C(O)NH—$CH_2$— in formula IIb), and also salts of said acids. Suitable salts are generally water-soluble salts, preferably the sodium, potassium and ammonium salts of said acids.

Particular preference is given to 1-acrylamidopropanesulfonic acid, 2-acrylamido-2-propanesulfonic acid, 2-acrylamido-2-methylpropanesulfonic acid (AMPS), 2-methacrylamido-2-methylpropanesulfonic acid, 3-methacrylamido-2-hydroxypropanesulfonic acid, 2-hydroxy-3-(2-propenyloxy)propanesulfonic acid, 2-sulfoethyl methacrylate, styrenesulfonic acid, vinylsulfonic acid, allylsulfonic acid (ALS) and methallylsulfonic acid, and also salts of said acids. These are preferred both as monomer (a3) and also (b2).

Very particularly preferred monomers comprising sulfonic acid groups are 2-acrylamido-2-methylpropanesulfonic acid (AMPS) and allylsulfonic acid, and also water-soluble salts thereof, in particular sodium, potassium and ammonium salts thereof. These are preferred both as monomer (a3) and (b2).

As component (b3), the copolymer comprises 0 to 70% by weight of at least one nonionic monomer of the formula (I)

$$H_2C=C(R^1)(CH_2)_xO[R^2-O]_o-R^3 \qquad (I),$$

where $R^1$ is hydrogen or methyl, $R^2$ is identical or different $C_2$-$C_6$ alkylene radicals, which can be linear or branched and arranged in blocks and/or randomly, and $R^3$ is hydrogen or a straight-chain or branched $C_1$-$C_4$ alkyl radical, x is 0, 1 or 2, and o is a natural number from 3 to 50.

The alkylene radicals can also be arranged in blocks and randomly, that is to say in one or more blocks of identical alkylene oxide radicals in blocks and, in addition, randomly in one or more blocks of two or more different alkylene oxide radicals. This is also included by the wording "arranged in blocks or randomly".

Preferred nonionic monomers (b3) are those based on allyl alcohol ($R^1$=H; x=1) and isoprenol ($R^1$=methyl; x=2).

The nonionic monomer (b3) preferably comprises on average 8 to 40, particularly preferably 10 to 30, especially 10 to 25, alkylene oxide units. The index o in the formula (I) relates to the median number of alkylene oxide units.

Preferred alkylene oxide units $R^2$—O are ethylene oxide, 1,2-propylene oxide and 1,2-butylene oxide, particular preference is given to ethylene oxide and 1,2-propylene oxide.

In a special embodiment, the nonionic monomers (b3) only comprise ethylene oxide units. In a further special embodiment, the nonionic monomers (b3) comprise ethylene oxide and 1,2-propylene oxide units which can be arranged in blocks or randomly.

Preferably, $R^3$ is hydrogen or methyl.

Generally, the weight-average molecular weight of the copolymers (A) is 1000 to 20 000 g/mol, preferably 1500 to 15 000 g/mol, and particularly preferably 2000 to 10 000 g/mol, and in particular 2000 to 8000 g/mol.

The molecular weight is determined by means of gel-permeation chromatography in comparison with polyacrylic acid standards.

Generally, the polydispersity index of the polymers (A) $M_w/M_n$ is ≤3.0, preferably ≤2.5.

The polymers (A) are preferably binary copolymers or terpolymers. If they are binary copolymers, they preferably comprise 20 to 60% by weight of monomer (a1)) and 40 to 80% by weight of monomer (a2), particularly preferably 25 to 50% by weight of monomer (a1) and 50 to 75% by weight of monomer (a2).

If they are terpolymers, they preferably comprise 25 to 50% by weight of monomer (a1), 30 to 60% by weight of monomer (a2) and 10 to 30% by weight of monomer (a3).

A plurality of different monomers (a1) and/or a plurality of different monomers (a2) can also be present in the polymers A. For example, terpolymers and quaterpolymers can comprise only monomers (a1)) and (a2), preferably in the amounts stated above for binary copolymers.

In a preferred embodiment of the invention, polymer (A) is a copolymer of isobutene and maleic acid, preferably in the quantitative ratios stated above for binary copolymers.

In a further preferred embodiment of the invention, polymer (A) is a copolymer of isoprenol and maleic acid, preferably in the quantitative ratios cited above for binary copolymers.

In a further embodiment of the invention, polymer (A) is a terpolymer of isoprenol, maleic acid and 2-acrylamido-2-methylpropanesulfonic acid, preferably in the quantitative ratios cited above for terpolymers. In a further preferred embodiment, allylsulfonic acid is used instead of 2-acrylamido-2-methylpropanesulfonic acid.

In a further embodiment of the invention, polymer (A) is a terpolymer of isoprenol, maleic acid and acrylic acid, preferably in the quantitative ratios cited above.

The polymers (B) are homopolymers or copolymers. Copolymers can comprise monomers (b1), monomers (b1) and (b2), monomers (b1) and (b3), and monomers (b1), (b2) and (b3). If copolymers of the monomers (b1) and (b2) are concerned, they preferably comprise 50 to 90% by weight of monomers (b1) and 10 to 50% by weight of monomers (b2), particularly preferably 60 to 85% by weight of monomers (b1) and 15 to 40% by weight of monomers (b2).

If copolymers of the monomers (b1) and (b3) are concerned, they preferably comprise 50 to 95% by weight of monomers (b1) and 5 to 50% by weight of monomers (b3), particularly preferably 60 to 90% by weight of monomers (b1) and 10 to 40% by weight of monomers (b3).

If copolymers of the monomers (b1), (b2) and (b3) are concerned, they preferably comprise 30 to 80% by weight of monomers (b1), 10 to 50% by weight of monomers (b2) and 5 to 50% by weight of monomers (b3), particularly preferably 40 to 75% by weight of monomers (b1), 15 to 40% by weight of monomers (b2) and 5 to 40% by weight of monomers (b3). Preference is given to binary copolymers, but they can also be terpolymers.

In a preferred embodiment of the invention, the polymer (B) is an acrylic acid homopolymer.

In a further preferred embodiment of the invention, polymer (B) is a copolymer of acrylic acid and 2-acrylamido-2-methylpropanesulfonic acid, preferably in the quantitative ratios cited above.

In a further preferred embodiment of the invention, polymer (B) is a copolymer of acrylic acid and allylsulfonic acid, preferably in the quantitative ratios cited above.

Generally, the weight-average molecular weight of the polymers (B) is 1000 to 50 000 g/mol, preferably 1000 to 30 000 g/mol and particularly preferably 1500 to 20 000 g/mol, and in particular 1500 to 10 000 g/mol.

The molecular weight is determined by means of gel-permeation chromatography in comparison with polyacrylic acid standards.

Generally, the polydispersity index of the polymers (B) $M_w/M_n$ is ≤2.5, preferably ≤2.0.

The present invention also relates to compositions comprising (A) 3 to 95% by weight of the water-soluble or water-dispersible polymers having a weight-average molecular weight of 1000 to 20 000 g/mol of
  (a1) 20 to 80% by weight of at least one monomer selected from the group consisting of $C_2$ to $C_8$ olefins, allyl alcohol, isoprenol, $C_1$ to $C_4$ alkyl vinyl ethers and vinyl esters of $C_1$ to $C_4$ monocarboxylic acids,
  (a2) 20 to 80% by weight of at least one monoethylenically unsaturated $C_3$ to $C_8$ carboxylic acid, an anhydride or salt of same,
  (a3) 0 to 50% by weight of one or more monomers comprising sulfonic acid groups,
(B) 3 to 95% by weight of the water-soluble or water-dispersible polymer having a weight-average molecular weight of 1000 g/mol to 50 000 g/mol of
  (b1) 30 to 100% by weight of at least one monoethylenically unsaturated $C_3$ to $C_8$ carboxylic acid, an anhydride or salt of same,
  (b2) 0 to 70% by weight of one or more monomers comprising sulfonic acid groups,
  (b3) 0 to 70% by weight of at least one nonionic monomer of the formula (I)

$$H_2C=C(R^1)(CH_2)_xO[R^2-O]_o-R^3 \qquad (I),$$

where $R^1$ is hydrogen or methyl, $R^2$ is identical or different, linear or branched, $C_2$-$C_6$ alkylene radicals, which can be arranged in blocks or randomly, and $R^3$ is hydrogen or a straight-chain or branched $C_1$-$C_4$ alkyl radical, x is 0, 1 or 2, and o is a number from 3 to 50,
(C) 0 to 80% by weight of phosphonates,
(D) 0 to 90% by weight of water;
(E) 0 to 50% by weight of additives such as polyphosphates, zinc salts, molybdate salts, organic corrosion inhibitors, biocides, complexing agents, surfactants or antifoams.

The weight ratio of polymers (A):(B) is generally from 1:20 to 20:1.

The compositions according to the invention can optionally comprise up to 80% by weight phosphonates (C). Phosphonates can additionally support the deposit-inhibiting activity of the polymers. In addition, they act as corrosion inhibitors.

Examples of phosphonates are 1-hydroxyethane-1,1-diphosphonic acid (HEDP), 2-phosphonobutane-1,2,4-tricarboxylic acid (PBTC), aminotrimethylenephosphonic acid (ATMP), diethylenetriaminepenta(methylenephosphonic acid) (DTPMP) and ethylenediaminetetra(methylenephosphonic acid) (EDTMP), and also the water-soluble salts thereof, in particular the sodium, potassium and ammonium salts thereof.

In addition, the compositions according to the invention can comprise up to 90% by weight of water.

In addition, the formulations can, in addition to the polymer mixtures according to the invention, optionally the phosphonates, and optionally water, according to requirements, also comprise up to 50% by weight of further additives (E) such as polyphosphates, zinc salts, molybdate salts, organic corrosion inhibitors such as benzotriazole, tolyltriazole, benzimidazole or ethynyl carbinol alkoxylates, biocides, complexing agents and/or surfactants.

The polymer mixtures of polymers (A) and (B) are generally produced by mixing the respective polymer solutions in stirred systems such as, e.g., in stirred tanks, by pneumatic circulation in containers, by circulation using pumps or by forced flow in pipes. Internals in the stirred systems, termed flow baffles, can accelerate the mixing operation. By installing fixed mixing elements in pipelines such as metal sheet lamellae, spirals or rigids, or mixing nozzles, the mixing operation can likewise be accelerated. The choice of the mixer or the mixing process depends on the respective requirements, in particular the viscosities and shear strengths of the polymer solutions that are to be mixed. Solid polymer mixtures can be produced by spray drying and spray granulation of the aqueous polymer mixtures or by mixing the solid polymers by means of rotating mixing drums, blade mixers, screw mixers, fluidized-bed mixers or air-shock mixers. The invention relates to both solid polymer mixtures, for example obtained by spray drying or spray granulation, and aqueous polymer mixtures. The water content of aqueous polymer mixtures is generally up to 90% by weight, preferably up to 70% by weight, particularly preferably up to 50% by weight.

The invention also relates to the use of the polymer mixtures and compositions as deposit inhibitors for inhibiting the precipitation and sedimentation of calcium salts and magnesium salts in water-bearing systems. Calcium salts the precipitation of which is inhibited are generally calcium carbonate, calcium sulfate, calcium phosphonates and calcium phosphates, in particular calcium carbonate and calcium sulfate. Magnesium salts the precipitation of which is inhibited are generally basic magnesium salts such as hydromagnesite and brucite.

Water-bearing systems in which the polymer mixtures are preferably employed are seawater desalination plants, brackish water desalination plants, cooling water systems and boiler feed water systems.

Surprisingly, it has also been found that the polymer mixtures according to the invention, owing to their dispersive properties and properties stabilizing Fe(III) ions, are outstandingly suitable for preventing iron-comprising sediments in water-bearing systems.

The invention therefore further relates to the employment of the polymer mixtures and compositions as deposit inhibitors for inhibiting the precipitation and sedimentation of iron-comprising salts and compounds. In particular, sedimentation of iron oxides and iron oxide hydrates (iron hydroxides) are prevented.

Generally, the mixtures according to the invention are added to the water-bearing systems in amounts from 0.1 mg/l to 100 mg/l. The optimum dosage depends on the requirements of the respective application or the operating conditions of the respective process. For instance, in the thermal desalination of seawater, the mixtures are preferably used in concentrations from 0.5 mg/l to 10 mg/l. In industrial cooling circuits or boiler feed water systems, dosages up to 100 mg/l are employed. Frequently, water analyses are carried out in order to determine the proportion of deposit-forming salts and thereby the optimum dosage.

The invention will be described in more detail by the examples hereinafter.

EXAMPLES

The median molecular weights were determined by means of GPC.
Instrument: Waters Alliance 2690 with UV-detector (Waters 2487) and RI detector (Waters 2410)
Columns: Shodex OHpak SB 804HQ and 802.5HQ (PHM gel, 8×300 mm, pH 4.0 to 7.5)
Eluent: 0.05 M aqueous ammonium formate/methanol mixture=80:20 (parts by volume)
Flow rate: 0.5 ml/min
Temperature: 50° C.
Injection: 50 to 100 µl
Detection: RI and UV Molecular weights of the polymers were determined relative to polyacrylic acid standards from Varian Inc. The molecular weight distribution curves of the polyacrylic acid standards were determined by light scattering. The masses of the polyacrylic acid standards were 115 000, 47 500, 28 000, 16 000, 7500, 4500, 4100, 2925 and 1250 g/mol.

Polymers 2, 3, 6, 7, 12 and 14 are produced by free-radical polymerization of the monomers in water using sodium peroxodisulfate as initiator and sodium hypophosphite (polymers 2 and 7) and sodium bisulfite (polymers 3, 6, 12 and 14) as molecular weight modifier.

Polymers 4, 5, 8, 9 and 13 are produced by free-radical polymerization of the monomers using a redox system of hydrogen peroxide, iron(II) sulfate and sodium hydroxymethanesulfinate as initiator and mercaptoethanol as chain-transfer agent.

Polymers 1, 10 and 11 are produced by free-radical polymerization of maleic anhydride with the respective comonomers in o-xylene or toluene using t-butyl perpivalate as initiator. Following the polymerization, a solvent exchange and hydrolysis of the anhydride ring are performed.

The aqueous polymer solutions are adjusted in each case to pH 7.5 (using sodium hydroxide solution) and a solids content of 40.0% by weight.

Polymers 1, 4, 5, 8, 9, 10 and 11 are polymers (A) in accordance with the abovementioned definition.

Polymers 2, 3, 6, 7, 12, 13 and 14 are polymers (B) in accordance with the abovementioned definition.

Polymer 1: Copolymer of maleic acid and isobutene (weight ratio 70:30), Na salt, $M_w$ 4000 g/mol, aqueous solution, pH 7.5, solids content: 40.0% by weight Polymer 2: Copolymer of acrylic acid and 2-acrylamido-2-methylpropanesulfonic acid (weight ratio 75:25), Na salt, $M_w$ 7000 g/mol, aqueous solution, pH 7.5, solids content: 40.0% by weight Polymer 3: Copolymer of acrylic acid and 2-acrylamido-2-methylpropanesulfonic acid (weight ratio 75:25), Na salt, $M_w$ 8000 g/mol, aqueous solution, pH 7.5, solids content: 40.0% by weight Polymer 4: Copolymer of maleic acid and isoprenol (weight ratio 65:35), Na salt, $M_w$ 4000 g/mol, aqueous solution, pH 7.5, solids content: 40.0% by weight Polymer 5: Copolymer of maleic acid and isoprenol (weight ratio 60:40), Na salt, $M_w$ 7500 g/mol, aqueous solution, pH 7.5, solids content: 40.0% by weight Polymer 6: Polyacrylic acid, Na salt, $M_w$ 1200 g/mol, aqueous solution, pH 7.5, solids content 40.0% by weight Polymer 7: Polyacrylic acid, Na salt, $M_w$ 3500 g/mol, aqueous solution, pH 7.5, solids content 40.0% by weight Polymer 8: Copolymer of maleic acid, isoprenol and 2-acrylamido-2-methylpropanesulfonic acid (weight ratio 40:40:20), Na salt, $M_w$ 7000 g/mol, aqueous solution, pH 7.5, solids content: 40.0% by weight Polymer 9: Copolymer of maleic acid, isoprenol and acrylic acid (weight ratio 35:40:25), Na salt, $M_w$ 3800 g/mol, aqueous solution, pH 7.5, solids content: 40.0% by weight Polymer 10: Copolymer of maleic acid and methyl vinyl ether (weight ratio 70:30), Na salt, $M_w$ 9500 g/mol, aqueous solution, pH 7.5, solids content 40.0% by weight Polymer 11: Copolymer of maleic acid and vinyl acetate (weight ratio 60:40), Na salt, $M_w$ 6500 g/mol, aqueous solution, pH 7.5, solids content 40.0% by weight Polymer 12: Copolymer of acrylic acid and allylsulfonic acid (weight ratio 80:20), Na salt, $M_w$ 5100, aqueous solution, solids content 40.0% by weight Polymer 13: Copolymer of acrylic acid and isoprenol polyethylene glycol of the formula $CH_2=C(CH_3)CH_2CH_2-(EO)_{11.3}-H$ (weight ratio 90:10), Na salt, $M_w$ 6200 g/mol, aqueous solution, solids content 40.0% by weight Polymer 14: Terpolymer of acrylic acid, 2-acrylamido-2-methylpropanesulfonic acid and allyl alcohol alkoxylate of the formula $CH_2=CHCH_2O-(EO)_{16}-H$ (weight ratio 55:30:15), Na salt, $M_w$ 8500 g/mol, aqueous solution, solids content 40.0% by weight The polymer mixtures are produced by mixing the 40% strength by weight polymer solutions. The amounts of solution are chosen in such a manner that a mixture of the desired polymer composition results. A mixture having a 50:50 composition has identical quantitative fractions (in % by weight) of the polymers used.

Use as Deposit Inhibitor

Examples 1 to 3

Calcium Carbonate Inhibition Test

A solution of $NaHCO_3$, $Mg_2SO_4$, $CaCl_2$ and polymer is shaken for 2 h at 70° C. in the water bath. After filtering the still-warm solution through a 0.45 μm Milex filter, the Ca content of the filtrate is determined complexometrically or by means of a $Ca^{2+}$-selective electrode and the $CaCO_3$ inhibition is determined by comparison of before/after in % in accordance with formula I hereinafter:

| | |
|---|---|
| $Ca^{2+}$ | 215 mg/l |
| $Mg^{2+}$ | 43 mg/l |
| $HCO_3^-$ | 1220 mg/l |
| $Na^+$ | 460 mg/l |
| $Cl^-$ | 380 mg/l |
| $SO_4^{2-}$ | 170 mg/l |
| Polymer mixture (100% strength) | 3 mg/l |
| Temperature | 70° C. |
| Time | 2 hours |
| pH | 8.0-8.5 |

$CaCO_3$ inhibition (%)=mg ($Ca^{2+}$) after 24 h−mg ($Ca^{2+}$) blank value after 24 h/mg ($Ca^{2+}$) zero value−mg ($Ca^{2+}$) blank value after 24 h×100    Formula I:

TABLE 1

| | Mixture composition in % by weight | Inhibition [%] |
|---|---|---|
| Example 1 | | |
| Polymer 4 | | 58.4 |
| Polymer 7 | | 80.7 |
| Mixture 4/7 | 50:50 | 83.4 |
| Mixture 4/7 | 35:65 | 86.8 |
| Example 2 | | |
| Polymer 1 | | 46.0 |
| Polymer 3 | | 64.8 |
| Polymer 6 | | 68.5 |
| Mixture 1/3/6 | 30:30:40 | 72.0 |
| Example 3 | | |
| Polymer 1 | | 46.0 |
| Polymer 13 | | 66.7 |
| Mixture 1/13 | 25:75 | 73.2 |

Examples 4 to 7

Calcium Sulfate Inhibition Test

A solution of NaCl, $Na_2SO_4$, $CaCl_2$ and polymer was shaken for 24 h at 70° C. in the water bath. After filtration of the still-warm solution through a 0.45 μm Milex filter, the Ca content of the filtrate is determined complexometrically or by means of a $Ca^{2+}$-selective electrode and the $CaSO_4$ inhibition in % determined by before/after comparison in accordance with formula II hereinafter:

| | |
|---|---|
| $Ca^{2+}$ | 2940 mg/l |
| $SO_4^{2-}$ | 7200 mg/l |
| $Na^+$ | 6400 mg/l |
| $Cl^-$ | 9700 mg/l |
| Polymer mixture (100% strength) | 10 mg/l |
| Temperature | 70° C. |
| Time | 24 hours |
| pH | 8.0-8.5 |

$CaSO_4$ inhibition (%)=mg ($Ca^{2+}$) after 24 h−mg ($Ca^{2+}$) blank value after 24 h/mg ($Ca^{2+}$) zero value−mg ($Ca^{2+}$) blank value after 24 h×100    Formula II:

TABLE 2

| | Mixture composition in % by weight | Inhibition [%] |
|---|---|---|
| Example 4 | | |
| Polymer 5 | | 51.9 |
| Polymer 6 | | 91.0 |
| Mixture 5/6 | 50:50 | 93.7 |
| Example 5 | | |
| Polymer 7 | | 68.9 |
| Polymer 11 | | 47.7 |
| Mixture 7/11 | 70:30 | 72.3 |
| Example 6 | | |
| Polymer 4 | | 58.4 |
| Polymer 12 | | 78.9 |
| Mixture 4/12 | 25:75 | 81.3 |
| Example 7 | | |
| Polymer 4 | | 58.4 |
| Polymer 14 | | 57.8 |
| Mixture 4/14 | 50:50 | 66.0 |

Examples 8 to 10

Experiments on Inhibiting Basic Mg Salt Sediments (DSL Method)

The deposit-inhibiting activity of the polymers according to the invention is carried out using a modified version of the "Differential Scale Loop (DSL)" instrument from PSL Systemtechnik. This is a "tube blocking system" as a fully automated laboratory system for studying precipitates and deposits of salts in pipelines and water pipes. In this instrument, in a modified mode of operation, a magnesium chloride solution A is mixed together with a sodium hydrogencarbonate solution B which comprises the polymer under test at a temperature of 120° C. and a specific pressure of 2 bar at a mixing point in the volumetric ratio 1:1 and pumped at a constant flow rate through a test capillary of stainless steel at constant temperature. In this case, the differential pressure between mixing point (starter capillary) and capillary end is determined. A rise of the differential pressure indicates deposit formation within the capillary due to basic magnesium salts (hydromagnesite, brucite). The time measured up to a pressure rise of a defined height (0.1 bar) is a measure of the deposit-inhibiting activity of the polymer used.

The specific experimental conditions are:

Solution A: 100 mM $MgCl_2$

Solution B: 200 mM $NaHCO_3$

Concentration of the polymer after mixing A and B: 10 mg/l

Capillary length: 2.5 m

Capillary diameter: 0.88 mm

Capillary material: stainless steel

Temperature: 120° C.

Total flow rate: 5 ml/min

System pressure: 2 bar

Pressure rise threshold: 0.1 bar

TABLE 3

Time taken to pressurize by 0.1 bar (mean value from four measurements)

| | Mixture composition in % by weight | Inhibition [min] |
|---|---|---|
| Example 8 | | |
| Polymer 1 | | 18.5 |
| Polymer 3 | | 23.9 |
| Mixture 1/3 | 50:50 | 28.0 |
| Example 9 | | |
| Polymer 2 | | 23.5 |
| Polymer 8 | | 24.9 |
| Mixture 2/8 | 40:60 | 30.3 |
| Example 10 | | |
| Polymer 6 | | 8.2 |
| Polymer 9 | | 20.0 |
| Polymer 10 | | 17.7 |
| Mixture 6/9/10 | 20:50:30 | 22.5 |

The invention claimed is:

1. A composition, consisting of:
(A) from 5 to 95% by weight of a water-soluble or water-dispersible polymer having a weight-average molecular weight of from 1000 to 20,000 g/mol of
(a1) from 20 to 80% by weight of at least one monomer selected from the group consisting of isobutene and isoprenol,
(a2) from 20 to 80% by weight of at least one monoethylenically unsaturated $C_3$ to $C_8$ carboxylic acid or anhydride or salt selected from the group consisting of acrylic acid, methacrylic acid, maleic acid and an anhydride or salt thereof, and
(a3) from 0 to 50% by weight of at least one selected from the group consisting of 2-acrylamido-2-methylpropanesulfonic acid (AMPS) and allylsulfonic acid (ALS) monomer comprising a sulfonic acid group; and
(B) from 5 to 95% by weight of a water-soluble or water-dispersible polymer having a weight-average molecular weight of from 1000 to 50,000 g/mol of
(b1) from 30 to 100% by weight of at least one monoethylenically unsaturated $C_3$ to $C_8$ carboxylic acid or anhydride or salt thereof selected from the group consisting of acrylic acid, methacrylic acid and an anhydride or salt thereof,
(b2) from 0 to 70% by weight of at least one selected from the group consisting of 2-acrylamide-2-methylpropanesulfonie acid (AMPS) and allylsulfonic acid (ALS) monomer comprising a sulfonic acid group, and
(b3) from 0 to 70% by weight of at least one nonionic monomer of formula (1):

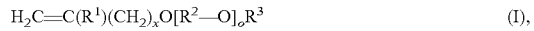

$$H_2C=C(R^1)(CH_2)_xO[R^2-O]_oR^3 \quad (I),$$

wherein $R^1$ is hydrogen or methyl,
each $R^2$ is independently a linear or branched, $C_2$-$C_6$ alkylene radical,
$R^2$ groups are arranged in blocks or randomly,
$R^3$ is hydrogen or a straight-chain or branched $C_1$-$C_4$ alkyl radical,
x is 0, 1 or 2, and
o is from 3 to 50.

2. The composition of claim 1, wherein the polymer (A) is a copolymer of from 20 to 60% by weight of the at least one monomer (a1) and from 40 to 80% by weight of the at least one carboxylic acid or carboxylic acid anhydride or salt (a2).

3. The composition of claim 1, wherein the polymer (A) is a copolymer of isobutene and maleic acid.

4. The composition of claim 1, wherein the polymer (A) is a copolymer of isoprenol and maleic acid.

5. The composition of claim 1, wherein the polymer (A) is a terpolymer of from 25 to 50% by weight of the at least one monomer (a1), from 30 to 60% by weight of the at least one carboxylic acid or carboxylic acid anhydride or salt (a2), and from 10 to 30% by weight of the at least one monomer (a3).

6. The composition of claim 5, wherein the polymer (A) is a terpolymer of isoprenol, maleic acid, and 2-acrylamido-2-methylpropanesulfonic acid; or a terpolymer of isoprenol, maleic acid and allylsulfonic acid.

7. The composition of claim 5, wherein the polymer (A) is a terpolymer of isoprenol, maleic acid, and acrylic acid.

8. The composition of claim 1, wherein polymer (B) is a homopolymer of a monoethylenically unsaturated $C_3$ to $C_8$ carboxylic acid or an anhydride or salt thereof.

9. The composition of claim 8, wherein polymer (B) is an acrylic acid homopolymer.

10. The composition of claim 1, wherein polymer (B) is a copolymer of from 50 to 90% by weight of the at least one carboxylic acid or carboxylic acid anhydride or salt (b1) and from 10 to 50% by weight of the at least one monomer (b2).

11. The composition of claim 10, wherein polymer (B) is a copolymer of acrylic acid and 2-acrylamido-2-methylpropanesulfonic acid.

12. The composition of claim 10, wherein polymer (B) is a copolymer of acrylic acid and allylsulfonic acid.

13. The composition of claim 1, wherein polymer (B) is a copolymer of from 50 to 95% by weight of the at least one carboxylic acid or carboxylic acid anhydride or salt (b1) and from 5 to 50% by weight of the at least one monomer (b3).

14. The composition of claim 13, wherein monomer (b3) is based on allyl alcohol wherein $R^1$=H and x=1, or on isoprenol wherein $R^1$=methyl and x=2.

15. The composition of claim 1, wherein polymer (B) is a copolymer of from 30 to 80% by weight of the at least one carboxylic acid or carboxylic acid anhydride or salt (b1), from 10 to 50% by weight of the at least one monomer (b2), and from 5 to 50% by weight of the at least one monomer (b3).

16. The composition of claim 15, wherein the at least one monomer (b3) is based on allyl alcohol wherein $R^1$=H and x=1 or on isoprenol wherein $R^1$=methyl and x=2.

17. A method of inhibiting a deposit in a water-bearing system, the method comprising: adding the composition of claim 1 in an amount of from 0.1 to 100 mg/L to a water-bearing system.

18. The method of claim 17, wherein the method inhibits precipitation and sedimentation of a calcium salt, a magnesium salt, or any combination thereof.

19. The method of claim 18, wherein the calcium salt, magnesium salt, or any combination thereof comprises calcium carbonate, calcium sulfate, a basic magnesium salt, or any combination thereof.

20. The method of claim 19, wherein the water bearing system is a seawater desalination plant, a brackish water desalination plant, a cooling water system, or a boiler feed water system.

* * * * *